United States Patent [19]

Nagashima

[11] 3,967,291
[45] June 29, 1976

[54] SHUTTER CONTROLLED FILM ADVANCING APPARATUS

[75] Inventor: Motoi Nagashima, Tokyo, Japan

[73] Assignee: Cima Kogaku Company Limited, Tokyo, Japan

[22] Filed: Nov. 12, 1974

[21] Appl. No.: 523,060

[30] Foreign Application Priority Data
Nov. 13, 1973 Japan.............................. 48-126795
Nov. 22, 1973 Japan.............................. 48-131920

[52] U.S. Cl................................. 354/171; 354/204; 242/71.5
[51] Int. Cl.² ........................................ G03B 1/18
[58] Field of Search ........... 354/170, 171, 172, 204, 354/209, 212, 213, 206, 266; 242/71.4, 71.5, 71.3, 71

[56] References Cited
UNITED STATES PATENTS

| | | | |
|---|---|---|---|
| 1,386,733 | 8/1921 | Rosen et al..................... | 242/71.5 X |
| 1,444,682 | 2/1923 | Griffiths......................... | 242/71.5 X |
| 1,448,414 | 3/1923 | Mietzelfeld..................... | 242/71.5 X |
| 1,448,526 | 3/1923 | Dobbin .............................. | 354/172 |
| 2,283,788 | 5/1942 | Briechle et al.................. | 354/204 X |
| 3,168,025 | 2/1965 | Padelt et al......................... | 354/170 |
| 3,864,706 | 2/1975 | Urano................................. | 354/209 |

FOREIGN PATENTS OR APPLICATIONS

| | | | |
|---|---|---|---|
| 209,178 | 5/1960 | Germany ............................ | 354/170 |

*Primary Examiner*—L. T. Hix
*Assistant Examiner*—Alan Mathews
*Attorney, Agent, or Firm*—Cushman, Darby & Cushman

[57] ABSTRACT

A photographic camera capable of either automatically or manually taking-up the film comprising a rotary drive means such as a spring motor or an electric motor for automatic take-up of the film and a manual actuating means such as a lever or a knob for manual take-up of the film, these rotary drive means and manual actuating means being connected to opposite ends of the film take-up shaft through a first and second directional clutches having operational directions opposite to each other. This photographic camera further comprises a first and a second shutter release members so as to enable the camera to perform the double exposure photographing even when the camera is in a condition wherein the automatic take-up of the film is available.

5 Claims, 9 Drawing Figures

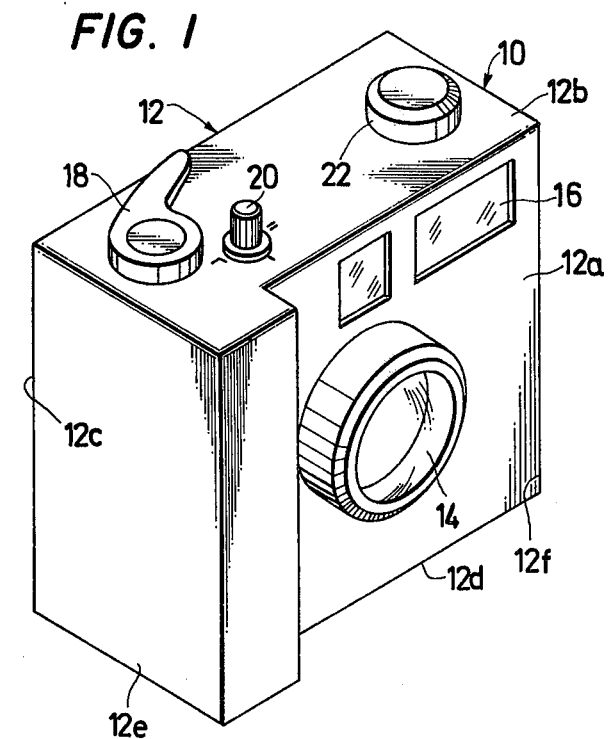
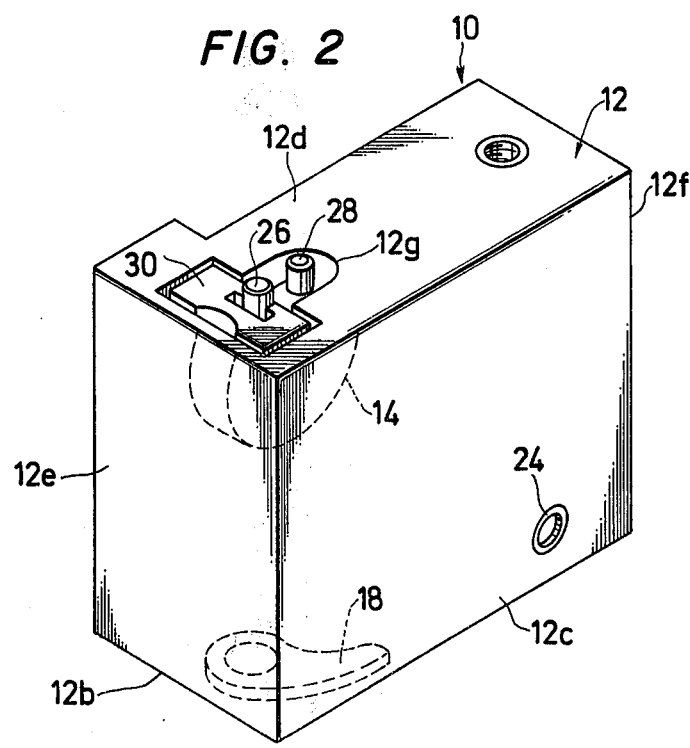

FIG. 4A     FIG. 4B     FIG. 4C
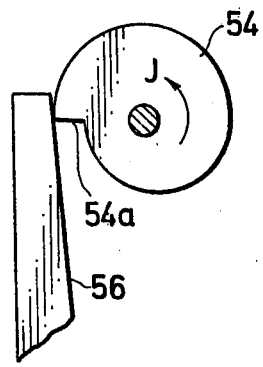 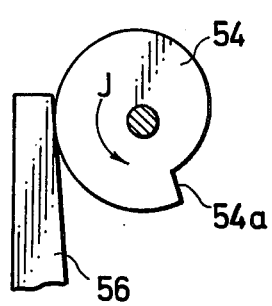 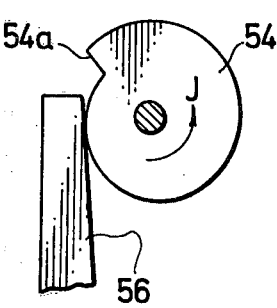
FIG. 5A     FIG. 5B     FIG. 5C
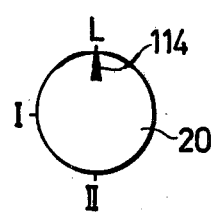 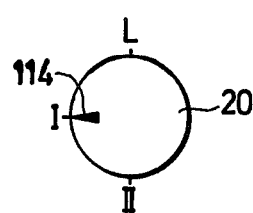 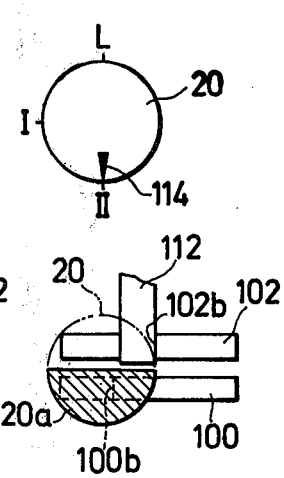
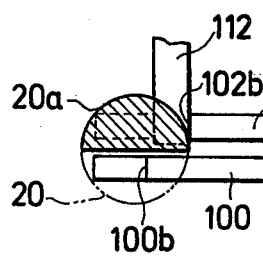 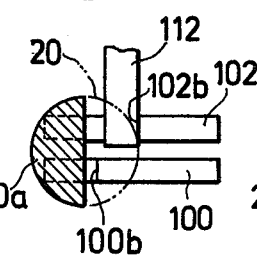

SHUTTER CONTROLLED FILM ADVANCING APPARATUS

BACKGROUND OF THE INVENTION

1. Field of the Invention:

The present invention relates generally to a photographic camera, and more particularly to such a camera capable of either automatically or manually taking up the roll film and of the double exposure photographing.

2. Description of the Prior Art:

It is well known of a photographic camera capable of automatically taking up the roll film for one frame immediately after every termination of the opening and closing operation of the shutter. Generally, however, the conventional photographic camera of this type has many drawbacks in that it has a tendency to be easily out of order because its automatic film take-up mechanism is not only intricate and requires much more parts but a relatively strong drive means is used as a drive power source for taking up the film and once the film take-up mechanism becomes out of order it is impossible at all to take up the film. Furthermore, in case that a spring motor is used in the automatic film take-up mechanism as the drive means, it is necessary to charge the spring motor when its spring power was reduced below the level where the spring motor can not take up the film, and therefore the user of the camera sometimes misses a good chance for releasing the shutter during the charging operation for the spring motor. Especially when the user of the camera photographs rapidly and sequentially many different scenes, the charging operation for the spring motor makes him nervous and irritating. Similarly, in case an electric motor is used in the automatic film take-up mechanism as the drive means, it is necessary to change batteries to new ones when their electric power was dissipated, and therefore the user of the camera sometimes misses a good chance for releasing the shutter during the changing operation of the batteries. Moreover, if the spare batteries are not at hand, it is impossible to continue photographing until the dissipated batteries are replaced to new ones. In addition to these drawbacks, the conventional photographic camera having the automatic film take-up mechanism has a drawback in that the double exposure photographing where the different scenes of more than one are photographed on the same frame of the film can not be performed because the film is automatically taken up for one frame immediately after the release of the shutter.

SUMMARY OF THE INVENTION

It is therefore a principal object of the present invention to provide a photographic camera which is capable of manually taking up the film when the automatic film take-up operation becomes inoperable.

It is a further object of the present invention to provide a photographic camera which is capable of the double exposure photographing even though the automatic film take-up operation is available.

It is still further object to provide a photographic camera which comprises a combination of a improved film take-up mechanism and a shutter release mechanism.

BRIEF DESCRIPTION OF THE DRAWING

Other objects and features of this invention will become apparent to those skilled in the art as the disclosure is made in the following description of a preferred embodiment of the invention, as illustrated in the accompanying drawings in which like reference characters designate the same parts throughout the figures thereof wherein FIG. 1 shows a top perspective view of the photographic camera according to the present invention;

FIG. 2 shows a bottom perspective view of the photographic camera shown in FIG. 1;

FIGS. 4A through 4C show fragmentary top plan views of the cam disk and the lock lever, which illustrate the relation between them in different condition;

FIGS. 5A through 5C show fragmentary top plan views of the shutter release button and the shutter release members with the shutter release button cut away, which illustrate the relation between the bottom end of the shutter release button and the shutter release members.

DETAILED DESCRIPTION OF THE PREFERRED EMBODIMENT

Figure 3:
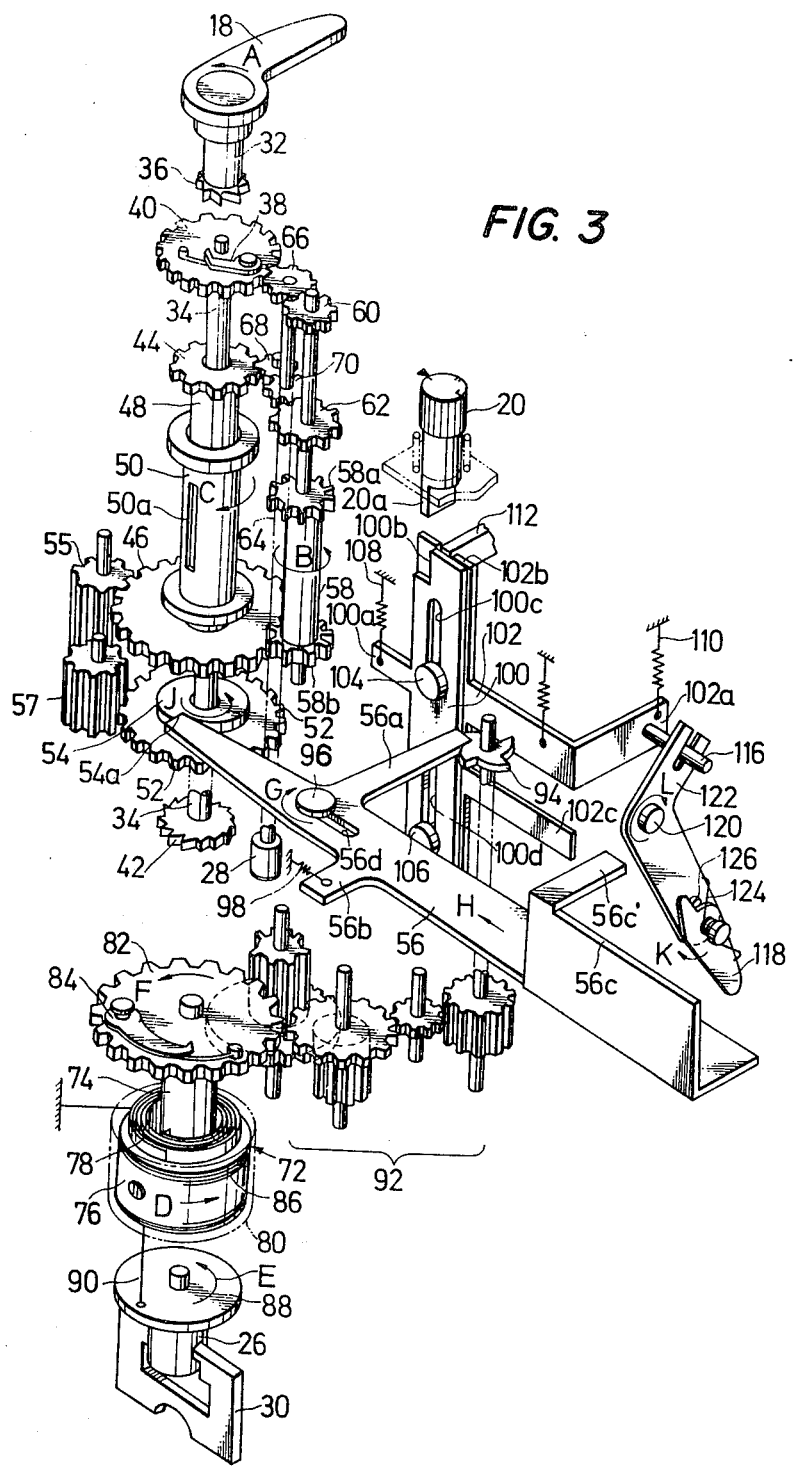
FIG. 3 shows an exploded perspective view of the film take-up mechanism incorporated with the shutter release mechanism, according to the present invention.

Referring now to FIGS. 1 and 2, there is shown a photographic camera 10 according to the present invention. The camera 10 comprises a body 12 having a front portion 12a to which a photographing lens system 14 and a view finder 16 are provided, a top portion 12b to which a film take-up lever 18 as a manual actuating means, shutter release button 20 and film rewind knob 22 are provided, a back portion 12c to which an eye piece 24 for the view finder 16 is provided, a bottom portion 12d and side portions 12e and 12f. At the bottom portion 12d, there is a recess 12g into which a shaft 26 for charging a spring motor 72 as will be described in detail hereinafter is extended from the inside of the body 12. A film rewind button 28 is also extended at the bottom portion 12d from the inside of the body 12. At the end portion of the shaft 26, a generally C-shaped knob 30 for rotating the shaft 26 is foldably mounted. This flat knob 30 is normally confined in the recess 12g and held upright when it is used.

As seen from FIG. 3 showing an exploded perspective view of a preferred embodiment of a film take-up mechanism and a shutter release mechanism, according to the present invention, the film take-up lever 18 is fixed at the top end of a shaft 32 which passes through the top portion 12b of the body and is rotatably mounted thereat. The shaft 32 is arranged so that its axis aligns with that of a film take-up shaft 34 rotatably supported in the body 12 in a suitable well known manner. At the bottom end of the shaft 32, a first ratchet-wheel 36 as a first directional clutch means is fixed. The shaft 32 is under the constant force exerted in the direction of an arrow A by a suitable spring means not shown in the drawing. At both ends of the film take-up shaft 34, a gear 40 on which a pawl 38 is pivotably mounted and a second ratchet wheel 42 as a second directional clutch means having a operational direction opposite to that of the first ratchet-wheel 36 are respectively fixed. At the intermediate portion of the film take-up shaft 34, an intermediate sleeve 48 having gears 44 and 46 at each end thereof is mounted rotatably with respect to the film take-up shaft 34. A film take-up spool 50 having a slit 50a is mounted so as to surround the intermediate sleeve 48. As is well known in the art, since a suitable frictional means (not shown) is provided between the intermediate sleeve 48 and the film take-up spool 50, only the intermediate sleeve 48 can rotate with respect to the film take-up spool 50 in the case where the load which exceeds the predetermined value is applied to the spool 50, but in other cases the spool 50 can rotate together with the intermediate sleeve 48 when the latter is rotated. A cam disk 54 fixed integrally with a gear 52 is mounted to the film take-up shaft 34 at a predetermined position below the gear 46 so as to rotate around the shaft 34. The cam disk 54 has a step portion 54a and is engageable with a lock lever 56 having arms 56a and 56b and an upwardly-directed bent portion 56c. Detailed description for the lock lever 56 will be given hereinafter. The above-mentioned gear 52 and the gear 46 mounted at the bottom end of the intermediate sleeve 48 are connected to each other through a pair of gears 55 and 57. Though a suitable charging means is connected to the gear 40 for the purpose of charging the shutter of the camera by the utilization of the rotation of the gear 40, however this charging means is not shown in the drawing and the detailed explanation therefore is ommitted since it has no direct relation with the subject matter of the present invention.

Inside the camera body 12, a sprocket 58 having a pair of well known sprocket gears 58a and 58b is rotatably supported at the position adjacent to and in parallel with the film take-up shaft 34. Gears 60 and 62 are respectively fixed to the extended shaft of the sprocket 58 at the positions which correspond to those of the gears 40 and 44. Another shaft 64 is suitably supported adjacent to and in parallel with both of the film take-up shaft 34 and sprocket 58 so that it moves in the direction of its axis. At the bottom end of the shaft 64, the film rewind button 28 which extends outwardly from the bottom portion 12d of the body 12 as described hereinbefore is fixed, and at the upper portion of the shaft 64, a gear 66 capable of meshing with both of the gears 40 and 60, and a gear 70 capable of meshing with the gear 62 and an idle gear 68 which meshes with the gear 44 are respectively fixed. By a spring means not shown in the drawing, the shaft 64 is normally held in the position (shown in FIG. 3) so that the gear 66 is meshed with the gears 40 and 60 and the gear 70 is meshed with the gears 62 and 68. Therefore, the film rewind button 28 is normally in the position shown in FIGS. 2 and 3. In this arrangement, if the film rewind button is depressed against the spring means (not shown) the gears 66 and 70 would be disengaged from other gears mentioned above owing to the movement of the shaft 64 in the upward direction of FIG. 3.

As it will be apparent from FIG. 3 that the pawl 38 positively engages with the ratchet-wheel 36 when the latter rotates in the direction of the arrow A and will be slipped on the periphery of the ratchet-wheel 36 when the latter rotates in the opposite direction of the arrow A, therefore, the gear 40 rotates together with the ratchet-wheel 36 and with the film take-up shaft 34 in the direction of the arrow A when the film take-up lever 18 is rotated in the direction of the arrow A against the spring means (not shown). This rotation of the gear 40, if the film rewind button is not depressed, would be transmitted to the sprocket 58 through the gears 66 and 60, so that the sprocket would be rotated in the direction of an arrow B. Since the rotation of the sprocket 58 in the direction of the arrow B is transmitted to the gear 44 through the gears 62, 70 and 68, the intermediate sleeve 48 is rotated in the direction of an arrow C and hence the film take-up spool 50 which is frictionally engaged with the intermediate sleeve 48 is rotated together with the latter in the direction of the arrow C. Therefore, if the upper and lower perforations of the roll film (not shown) are in engagement with the sprocket gear 58a and 58b and the extreme end portion of the film is in the slit 50a, the film may be fed by the sprocket 58 and taken up around the film take-up spool 50 in accordance with the rotation of the film take-up lever 18 in the direction of the arrow A.

Below the film take-up shaft 34, a spring motor 72 as a rotary drive means is contained in the camera body 12 with the axis of its rotary drive shaft 74 aligning with the axis of the film take-up shaft. This spring motor 72 is basically comprised with the rotary drive shaft 74, a short cylindrical ring 76 arranged to surround the rotary drive shaft 74 and a involuted spring 78 with its one end fixed to the rotary drive shaft 74 and with its other end fixed to the cylindrical ring 76, and the ring 76 and the spring 78 are contained in the spring box 80 shown in phantom. The drive shaft 74 is rotatably supported in the spring box 80, and the ring 76 is suitably supported in the spring box 80 so as to rotate with respect to the drive shaft 74. At the top end of the drive shaft 74 which extends upwardly from the spring box 80, a gear 82 is fixed. Mounted pivotably on the gear 82 is a pawl 84 which can mesh with the second ratchet-wheel 42 fixed at the bottom end of the film take-up shaft 34. A first spring clutch 86 is wound around the periphery of the cylindrical ring 76 with its one end fixed to the suitable position of the camera body 12 and the other end left freely on the cylindrical ring 76. As the first spring clutch 86 is so wound around the ring 76 that it could be loosen with respect to the rotation of the ring 76 in the direction of an arrow D and could be constricted with respect to the rotation of the ring 76 in the opposite direction of the arrow D, the ring 76 having a built-in arrangement as to rotate only in the direction of the arrow D, that is, the first spring clutch 86 prevents the ring 76 from rotating in the opposite direction of the arrow D. Below the spring motor 72, the shaft 26 for charging the spring 78 is rotatably supported with its axis aligning with that of the rotary drive shaft 74. A disk 88 is fixed at the top end of the shaft 26 in coaxial relation, and at the bottom end portion of the shaft the C-shaped knob is rotatably attached as described hereinbefore. As already described, the bottom end portion of the shaft 26 is extended into the recess 12g of the bottom portion 12d of the camera body 12 (refer to FIG. 2). The cylindrical ring 76 of the spring motor 72 and the disk 88 are connected to each other by a second spring clutch 90 which is wound on the periphery of the ring 76 with its one end fixed to the disk 88. As the second spring clutch 90 is having such built-in arrangement as to wind around the ring 76 in the direction opposite to that of the first spring clutch 86, the ring 76 is rotated together with the disk 88 in the direction of an arrow D when the disk 88 is rotated in the direction of the arrow E by the manipulation of the C-shaped knob. Therefore, under the such condition that the rotation of the drive shaft 74 of the spring motor is being held, then the rotation of the disk 88 in the direction of the arrow E through the manipulation of the C-shaped knob 30 would cause the ring 76 be rotated in the direction of the arrow D together with the one end of the spring 78. As a result, the spring 78 is constricted, that is, the spring motor 72 is charged. Under this charged condition, the rotary force in the opposite direction of the arrow D is being always exerted to the ring 76 when the force for charging the spring 78 is removed from the C-shaped knob, however, the rotation of the ring 76 in the opposite direction of the arrow D is prevented by the first spring clutch 86. In the condition that the spring motor 72 is charged as in the manner described above, if the preventive force against the rotation of the drive shaft 74 is released then the drive shaft 74 would be rapidly rotated together with the gear 82 in the direction of an arrow F. Since the rotation of the drive shaft 74 is transfered to the film take-up shaft 34 through the second ratchet wheel 42, the sprocket 58 and the film take-up spool 50 are respectively rotated in the directions of the arrow B and C, as in the same manner as in case that the film take-up lever 18 is rotated in the direction of the arrow A. Since the first and second ratchet-wheels 36 and 42 are so arranged that their directions of the teeth are opposite to each other, the second ratchet-wheel 42 is slipped with respect to the pawl 84 when the film take-up shaft 34 is rotated by the film take-up lever 18 and the pawl 38 is slipped with respect to the first ratchet-wheel 36 when the film take-up shaft 34 is rotated by the spring motor 72. This means that the rotary force for taking up the film can be applied to the film take-up shaft 34 by either the film take-up lever 18 or the spring motor 72 with one not influenced at all by the other. The rotation of the rotary drive shaft 74 by the spring 78 is prevented by a cooperation of a four-teethed gear 94 connected with the gear 82 through a multiplying gear train 92, the cam disk 54 and the lock lever 56. The lock lever 56 is arranged so that its one end and arm 56a can be respectively engaged with the cam disk 54 and the four-teethed gear 94, and is rotatable with respect to a headed pin 96 which is fixed to a suitable stationary member not shown in FIG. 3 and which is passed through a elongated slot 56d formed adjacent to the base portion of the arm 56a. The lock lever 56 is also movable in its longitudinal direction in the range defined by the elongated slot 56d. The lock lever 56 is continuously forced in the direction of an arrow G by a spring 98 arranged between the arm 56b and a suitable stationary member.

FIG. 3 shows the film take-up mechanism and the shutter release means in a condition immediately after one frame of the film were taken up. In this condition, since the one end of the lock lever 56 and the extreme end of the arm 56a are respectively contacted with the step portion 54a of the cam disk 54 and the teeth of the gear 94, both the sequential rotation of the film take-up lever 18 in the direction of the arrow A and the rotation of the rotary drive shaft 74 of the spring motor in the direction of the arrow F is prevented. However, if the spring motor 72 is in a charged condition and the lock lever 56 is forced to rotate in the opposite direction of the arrow G with the pin 96 being acted as an rotary axis, the film take-up shaft 34 would be rotated by the spring motor 72 because the engagements between the one end of the lock lever 56 and the step portion 54a of the cam disk 54 and between the extreme end of the arm 56a and the gear 94 are concurrently disengaged, and so that the film (now shown) can be taken up around the film take-up spool 50. If the spring motor 72 is not in the charged condition and the lock lever 56 is rotated in the opposite direction of the arrow G, the film take-up shaft 34 can be rotated by manually rotating the film take-up lever 18 in the direction of the arrow A and hence the film is taken up around the film take-up spool 50.

At the same time with the disengagements between the one end of the lock lever 56 and the step portion 54a of the cam disk 54 and between the extreme end of the arm 56a of the lock lever 56, and the gear 94, the lock lever 56 is forced to move by the spring 98 in the direction of an arrow H to the extent of the length of the elongated slot 56d, so that the relative position between the lock lever 56 and the cam disk 54 becomes that shown in FIG. 4A. If the spring motor 72 is in a charged condition at this moment, the film take-up operation by the spring motor 72 is immediately commenced as described above and the cam disk 54 is rotated concurrently in the direction of an arrow J. Therefore, the relative position between the cam disk 54 and lock lever 56 becomes that shown in FIG. 4C through the relative position shown in FIG. 4B as the rotation of the cam disk 54 is advanced. The sequential rotation of the cam disk 54 causes its step portion 54a to engage with the extreme end of the lock lever 56, so that the lock lever 56 is forced to move against the spring 98 in the opposite direction of the arrow H. The film take-up operation for taking up one frame of the film is completed when the lock lever 56 is returned into the position shown in FIG. 3 and, at the same time, the rotation of the drive shaft 74 of the spring motor 72 is held up because the tooth of the gear 94 which is being rotated by the gear train 92 is brought into engagement with the extreme end of the arm 56a of the lock lever 56. In the case that the spring motor 72 is not in a charged condition, the return of the lock lever 56 to the position shown in FIG. 3 be achieved by manually rotating the film take-up lever 18, through FIGS. 4A, 4B and 4C as in the exact same manner as in the case that the spring motor 72 is used. Therefore, it is apparent that one frame of the film is also taken up by manually rotating the film take-up lever 18.

The rotation of the lock lever 56 in the opposite direction of the arrow G i.e. the release of the lock being hold of the film take-up operation is performed by the shutter release mechanism which will be described in detail in the following description. As shown in FIG. 3, the shutter release mechanism includes a first and second shutter release members 100 and 102 which are moved downwardly by the bottom end of the shutter release button 20 when the latter is depressed downwardly. The first shutter release member 100 has an arm 100a, a cutout portion 100b at the top end portion thereof and elongated slots 100c and 100d at the middle portion thereof. The second shutter release lever 102 has a bent arm 102a the extreme end of which extends backwardly. At the top end portion of the second shutter release member 102 a lacked portion 102b is formed and elongated slots (not shown) same as the slots 100c and 100d are formed at the middle portion of the second shutter release member 102. The second shutter release member 102 also has an arm 102c. These first and second shutter release member are arranged in parallel with each other in face to face relation with a suitable narrow gap between them. Headed pins 104 and 106 which are fastened to a suitable fixed member (not shown) pass through the slots of the first and second shutter release members.

Therefore the first and second shutter release members can move upwardly and downwardly with the pins 104 and 106 being as guides. These first and second shutter release members 100 and 102 are held so long as the shutter release button 20 is not depressed, in upper limited position shown in FIG. 3 by springs 108 and 110 which are respectively connected between suitable fixed members (not shown) and the arms 100a and 102a. At the upper limited position of the first and second shutter release member 100 and 102, the top extreme ends of the member 100 and 102 are flush with each other and a stopper arm 112 extended from a suitable fixed member (not shown) is loosely inserted in the cutout portion 102b. The bottom ends of the first and second shutter release members are independently engaged with a well known shutter mechanism not shown in the drawing so that the shutter may be released by either the first or the second shutter release members 100 and 102 on the way that one of the shutter release members 100 and 102 is moved from its upper limited position to its lower limited position.

As shown in FIG. 3, the shutter release button 20 has a bottom extreme end 20a formed in a half moon shape by cutting off a part of the bottom portion of the shutter release button 20, and is rotatably arranged to the top portion 12b of the camera body 12 so that the engagement of the bottom extreme end 20a with the release members 100 and 102 and the stopper arm 112 can be controlled. As a matter of fact, the shutter release button 20 engages three different positions by its rotation. As shown in FIG. 5A, in the case that the shutter release button 20 is set at the position where in indicating mark 114 on the shutter release button 20 is aligned with a symbol "L" on the top portion 12b of the camera body 12, the bottom extreme end 20a in a half moon shape is faced with both the second shutter release member 102 and the stopper arm 112. As shown in FIG. 5B, in the case that the shutter release button 20 is set at the position where the indicating mark 114 is aligned with a symbol I, the bottom extreme end 20a is faced with both the first and second shutter release members 100 and 102. In the case that the shutter release button 20 is rotated into the position where the indicating mark 114 is aligned with a symbol II as shown in FIG. 5C, the bottom extreme end 20a is faced with only the first shutter release member 100. Therefore, it is impossible to depress the shutter release button 20 in the case that the shutter release button 20 is in a position shown in FIG. 5A because the bottom extreme end 20a of the button 20 is brought into engagement with the fixed stopper arm 112. On the other hand, if the shutter release button 20 is in a position shown in FIG. 5B, the button can be depressed and causes only the second shutter release member 102 to move downwardly. Furthermore, if the shutter release button 20 is in a position shown in FIG. 5C, only the first shutter release member 100 is moved downwardly in accordance with the depression of the shutter release button 20.

Referring back to FIG. 3, a pin 116 is fixed to the bent arm 102a of the second shutter release member 102. The pin 116 is engaged with furcations of the forked end portion of a bell crank 122 which rotates on a pin 120, that is supported by a suitable fixed member (not shown). At the other end portion of the bell crank 122 a rotatable lever 118 is mounted. Although the rotatable lever 118 is continuously forced in the direction of an arrow K by a spring 124, it is also held in the position shown in FIG. 3 by a stopper pin 126 fixed to the bell crank 122. According to this arrangement, the bell crank 122 rotates in the direction of an arrow L when the second shutter release member 102 is moved downwardly. The length and the position of the rotatable lever 118 with respect to the upwardly-bent portion 56c is being so determined that the rotatable lever 118 begins to rotate in the opposite direction of the arrow K by the upwardly-bent portion 56c of the lock lever 56 when the former is pressed against the latter by the rotation of the bell crank 122 in the direction of the arrow L and, soon after, the rotatable lever 118 gets over upwardly-bent portion 56c and is brought in front of it when the second shutter release member 102 is reached its lower limited position; and that the rotatable lever 118 does not contact with the upwardly-bent portion 56c when the lock lever 56 is forced to move in the direction of the arrow H into such extent limited by the length of the elongated slot 56d. Therefore, on the returning swing of the rotatable lever 118, which would be positioned in front of the upwardly-bent portion 56c when the second shutter release member 102 is in its lower limited position, can force the upwardly-bent portion 56c to rotate it in the opposite direction of the arrow G so as to respectively release the engagements between the step portion 54a of the cam disk 54 and the one end of the lock lever 56 and between the extreme end of the arm 56a and the four-teethed gear 94 while the second release member 102 is moving from lower limited position to upper limited position by spring 110. Since the lock lever 56 is moved in the direction of the arrow H by the spring 98 when the engagement between the step portion 54a and the one end of the lock lever 56 is released by the rotation of the lock lever 56, the rotatable lever 118 can be returned into the position shown in FIG. 3 without any interference with the upwardly-bent portion 56c together with the bell crank 122 and the second shutter release member.

As is apparent from the foregoing explanation, both the film take-up mechanism and the shutter release mechanism are in the position shown in FIG. 3 when they are in the stand-by condition for photographing. When it is desired for the camera to perform the normal or usual photographing where one frame of the film is automatically taken up subsequent to each depression of the shutter release button, the spring motor 72 is first charged sufficiently by the C-shaped knob 30 and the shutter release button 20 is set into the position where the indicating mark 114 on the button 20 is aligned with the symbol I on the top portion 12b of the camera body 12. In this condition, if the shutter release button 20 is depressed, the second shutter release member 102 is moved downwardly and hence the shutter is released. Therefore, one photographing is completed. Since the second shutter release member 102 is returned to the position shown in FIG. 3 by the spring 110 when the depressing force to the shutter release button 20 is removed, the lock lever 56 is rotated in the opposite direction of the arrow G through the rotatable lever 118 as already described. As a result, the rotary drive force from the spring motor 72 is transferred to the film take-up shaft 34 and one frame of the film is taken up. Since an arm 56c' formed integrally to the upwardly-bent portion 56 c is positioned below the arm 102c when the film is being taken up automatically so as to prevent the second shutter release member 102 from moving downwardly, the shutter is not faultily released during the automatic film take-up operation even though the shutter release button 20 is unintentionally depressed. All the parts or members shown in FIG. 3 is returned into the position shown in the same figure when the film take-up operation is completed. Since the shutter is charged through the shutter charging means (not shown) connected to the gear 40 concurrently with the film take-up operation, next photographing can be performed when the shutter release button 20 is depressed again.

When it is desired for the camera 10 to perform the double-exposure photographing where the different scenes more than one are photographed on the same frame of the film, the shutter release button 20 is set into the position where the indicating mark 114 on the release button 20 is aligned with the symbol II on the top portion 12b of the camera body 12. In this condition, if the shutter release button 20 is depressed, the first shutter release member 100 is moved downwardly and hence the shutter is released. Therefore, one photographing is completed. However, since the first shutter release member 100 is completely independent from the film take-up mechanism, the film take-up mechanism is held in the position shown in FIG. 3 even though the shutter is released, so that the film take-up operation is not automatically performed subsequent to the release of the shutter. In this condition, if the film take-up lever 18 is manually rotated in the direction of the arrow A after the connections between the gear 40 and 60 and between the 62 and 68 are released by the depression of the film rewind button 28, the rotation of the shaft 32 is not transferred to the gear 44 fixed to the interemediate sleeve 48 but the gear 40 to which the shutter charging means (not shown) is connected would rotate. Therefore, the shutter is charged in spite of that the film is not taken up. Accordingly, if the shutter release button 20 is depressed again subsequent to the above-mentioned operation, the another different scene is photographed on the same frame on which the first scene is already photographed.

Take-up of the film after the double exposure photographing is ended may be performed either by manipulating the film take-up lever 18 or by the spring motor 72. In the latter case, it is necessary to reset the shutter released button 20 into the position where the indicating mark 114 is aligned with the symbol I before the second scene is photographed, and if so, the film would be automatically taken up immediately after the double exposure photographing is completed.

If the shutter release button 20 is set in the position where the indicating mark 114 is aligned with the symbol L, the shutter is never released even though unintentional force is applied onto the shutter release button 20. Therefore, it is recommended that the shutter release button 20 be set in the position shown in FIG. 5A if there might be considerable time interval until next photographing. Though the first and second shutter release members 100 and 102 are directly depressed by the bottom end of the shutter release button 20 in the embodiment described above, it may be possible to connect the shutter release button 20 with the first and second shutter release members 100 and 102 through a suitable link means. The constructions of the first and second shutter release members 100 and 102 may be changed to another ones in consideration of the other mechanisms of the camera.

What is claimed is:

1. A photographic camera having a film take-up mechanism for either manually or automatically taking up the film, which comprises:
   a film take-up shaft;
   a first directional clutch means;
   a manual actuating means having a shaft which is connected to one end of the film take-up shaft through the first directional clutch means;
   a second directional clutch means having an operational direction opposite to that of the first directional clutch means; and
   a spring motor having a rotary drive shaft which is connected to the other end of the film take-up shaft through the second directional clutch means; each axis of said film take-up shaft, said shaft of the manual actuating means and said rotary drive shaft being aligned with each other.

2. A photographic camera according to claim 1, said first and second directional clutch means are ratchet-wheels.

3. A photographic camera according to claim 1, said manual actuating means is a film take-up lever.

4. A photographic camera according to claim 1, further comprises:
   a shutter means;
   a lock means connected to said spring motor for locking the operation thereof; and
   a shutter release mechanism for releasing the shutter including
      a first shutter release member movable between the first and the second positions and connected to said shutter means so that the shutter means is released by the movement, from the first position to the second position, of the first shutter release member,
      a second shutter release member movable between the first and the second positions and connected to said shutter means and to said lock means so that the shutter means is released by the movement, from the first position to the second position, of the second shutter release member and that the locking operation of said lock means is released by the movement, from the second position to the first position, of the second shutter release member, and
      a shutter release button selectively connected to one of the first and the second shutter release members;
   whereby the shutter can be released with no relation to the operation of the spring motor when the shutter release button is connected to the first release member.

5. A photographic camera according to claim 4, said shutter release button is selectively connected either one of the first and the second shutter release members by rotationally changing the position of the shutter release button.

* * * * *